Jan. 7, 1941.　　　　E. K. CLARK　　　　2,228,073
THERMOSTAT
Filed Sept. 7, 1939　　　2 Sheets-Sheet 1

WITNESSES:

INVENTOR
Earl K. Clark.
BY W. R. Coley
ATTORNEY

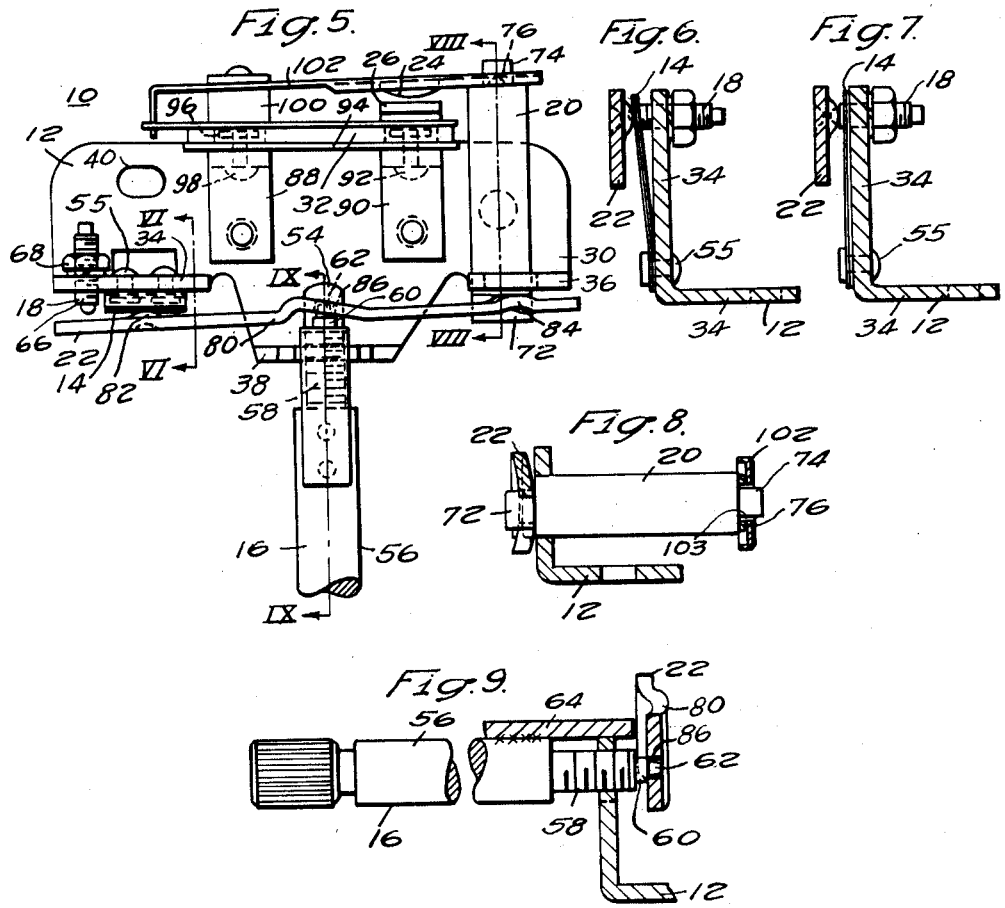

Patented Jan. 7, 1941

2,228,073

UNITED STATES PATENT OFFICE 2,228,073

THERMOSTAT

Earl K. Clark, Mansfield, Ohio, assignor to Westinghouse Electric & Manufacturing Company, East Pittsburgh, Pa., a corporation of Pennsylvania Application September 7, 1939, Serial No. 293,681

5 Claims. (Cl. 200—138)

My invention relates to thermostats and more particularly to a slow make-and-break thermostat.

It is a well known feature of slow make-and-break thermostats that as the contacts thereof separate in a natural or slow manner, the arc drawn therebetween and the current passing therethrough will develop a large amount of heat. This heat development, which is inherent with such thermostats, affects the operation of the bimetallic member, which has heretofore been closely associated with the contacts, and at times causes the contacts to flutter at the opening value. Such action cannot be tolerated on present day appliances because of its radio-interfering action and the resultant short life of the contacts.

It is therefore an object of my invention to provide a slow make-and-break thermostat having cooperating contacts which will operate positively and which are displaced from the heat-responsive member so that the heat produced within the contacts will not be conducted to the member in such manner as to affect its operation.

A further object of my invention is to provide an efficient, inexpensive, rugged slow make-and-break thermostat which may be easily adjusted, whereby such thermostat may be satisfactorily used on a domestic appliance, such as a waffle iron, sandwich grill, or the like, and which will maintain a preselected temperature or degree of baking for such structure.

Another object of my invention is to provide a thermostat having an adjustable "off" position which, when working in conjunction with an adjusting member, reduces the movement of such member to a minimum and ensures positive switch operations regardless of associated temperature conditions.

Still a further object of my invention is to provide a slow make-and-break thermostat having cooperating contacts which are biased into positive engagement.

Still another object of my invention is to provide a slow make-and-break thermostat having a bimetallic member which is not directly associated with the contacts, whereby any "fluttering" or "hunting" action of such member will not be transmitted to the contacts.

Other objects of my invention will either be pointed out specifically in the course of the following description of a device embodying my invention, or will be apparent from such description.

In the accompanying drawings,

Fig. 5 is a view similar to Fig. 2 illustrating the thermostat in an open or disengaged position;

Figs. 6 and 7 are enlarged sectional views taken along the line VI—VI of Fig. 5 illustrating the thermostat in its open and closed positions, respectively;

Fig. 8 is a sectional view taken along the line VIII—VIII of Fig. 5;

Fig. 9 is a sectional view taken along the line IX—IX of Fig. 5, and

Fig. 10 is a perspective view of the supporting structure used in the thermostat embodying my invention.

Figure 1:
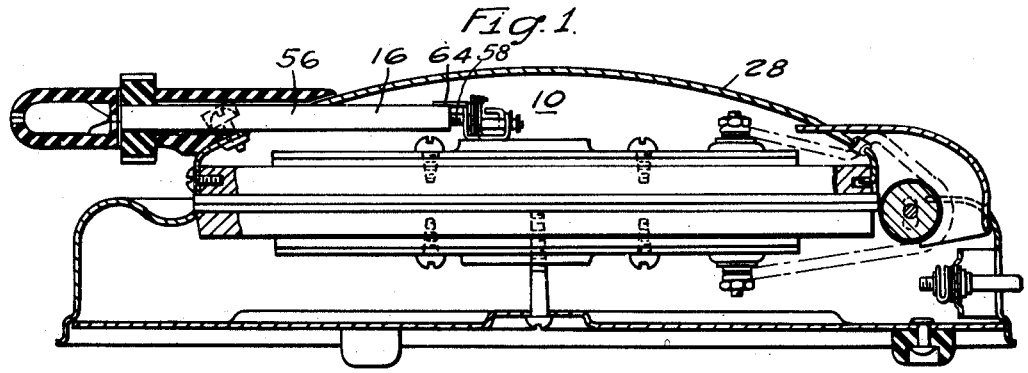
Figure 1 is a sectional view of an appliance having a thermostat embodying my invention associated therewith.

Referring to the accompanying drawings, in which like reference characters represent like parts in the several figures, I show a circuit interrupter or thermostat 10, including a base or supporting structure 12, a thermal responsive element 14, an adjusting member 16 and adjustable stop member 18, a slidable member 20, an arm 22 fulcrumly mounted upon the adjusting member 16 and cooperating with the thermostatic responsive element 14, adjustable stop member 18, and slidable member 20 for disengaging cooperating contacts 24 and 26 in response to the movements of the thermally responsive element 14 and adjusting member 16.

The thermostat or circuit interrupter 10 herein described is especially adapted for use with a waffle iron, sandwich grill, or the like, 28 (see Fig. 1) and was developed primarily for use with the novel appliance handle and control structure disclosed in a copending application of B. F. Parr, Serial No. 284,148, filed July 13, 1939, and assigned to the assignee of the present invention. However, it is to be understood that the thermostat or circuit interrupter 10 hereinafter described may be used or associated with any other desired structure or appliance in a well known manner.

The supporting structure 12 is, in this instance, formed from a single sheet of metal. However, it is to be understood that the supporting member may be formed in any other suitable manner or from any other desirable material. The supporting structure 12 includes a horizontally disposed base portion 30, an upwardly extending contact-supporting portion 32 located along the rear edge of the base 30, an upwardly extending thermally responsive and adjustable stop supporting portion 34 located at one end of the front edge of base 30, an upwardly extending pin supporting portion 36 located at the other end of the front edge of base 30 and a centrally located upwardly extending adjusting member support portion 38.

The base portion 30 has a plurality of apertures 40 and 42 located therein for permitting the supporting structure 12 to be rigidly attached to the appliance 28 in a well known manner. The upwardly extending contact supporting portion 32 has a plurality of apertures 44 located therethrough to permit the cooperating contacts 24 and 26 to be rigidly attached thereto in a manner hereinafter described. The upwardly extending thermally responsive and adjustable stop portion 34 has a plurality of apertures 46 and 48 located therein to permit the thermal responsive element 14 and adjustable stop member 18 to be attached thereto.

The upwardly extending pin supporting portion 36 has an irregularly shaped notch 50 located within the inner edge thereof to permit the slidable member 20 to be slidably positioned therein as hereinafter described. The upwardly extending adjusting member support portion 38 has a threaded aperture 52 located in the upper portion thereof to permit the adjusting member 16 to be rotatably located therein and supported thereby. The portion 38 may, if desired, be strengthened by means of a diagonally positioned inwardly extending notched or crimped portion 54 which is integral with the base 30 and portion 38. The notch portion 54 being integral with the base 30 and portion 38 may thus rigidly support the portion 38 and prevent the adjusting member 16 and portion 38 from being moved with respect to the base portion 30.

The thermal responsive element 14 is, in this instance, a strip of bimetallic material which is adapted to flex outwardly from the portion 34 of supporting structure 12 with an increasing temperature of such element. The bimetallic member or thermal responsive element 14 is rigidly attached to the lower edge of the portion 34 by means of suitable rivets 55 (see Figs. 2 to 7, inclusive).

By having the bimetallic member 14 rigidly attached to the supporting structure 12 at a point near the base thereof it is obvious that the heat conducted to the supporting structure 12 through the base thereof will be quickly conducted to the bimetallic member 14. The bimetallic member 14 will thus closely approximate the temperature of the cooking grid of appliance 28 upon which the base 30 of supporting structure 12 is rigidly attached and with which the base is in good thermal communication. This, in turn, ensures an accurate and effective operation of the thermally responsive element or bimetallic member 14.

The adjusting member 16 includes, in this instance, an elongated shaft 56 which has a reduced diameter threaded portion 58 located upon the end thereof (see Fig. 9). The shaft 56 of adjusting member 16 is or corresponds to the control shaft 30 illustrated and described in the above-identified copending application. The threaded end portion 58 of adjusting member 16 has a pitch of such magnitude, which is relatively small, in this instance, that as the shaft 56 is rotated within the threaded aperture 52 of portion 38, the free end of such shaft will be moved a predetermined longitudinal distance. This feature, in cooperation with arm 22, enables the circuit interrupter to be readily adjusted to any desired value, including an off position, with a minimum rotation of the shaft 56 as hereinafter described.

A small shoulder or cylindrical protrusion 60 and an elongated tapered pin portion 62 are located upon the end of the shaft 56 and are adapted to cooperate with the arm 22 and to provide a pivot point or fulcrum about which the arm 22 may rock as hereinafter described. A stop bar 64 is rigidly attached to the shaft 56 of adjusting member 16 and is adapted to cooperate with the portion 38 of supporting structure 12 so as to limit the rotation of the adjusting member 16 and to prevent an operator from accidentally removing the operating member from the supporting structure.

The adjustable stop member 18 comprises, in this instance, a screw 66 having a ball point. The screw 66 is threadedly engaged within the aperture 48 of the supporting structure 12 and due to such threaded engagement is adapted to be bodily moved with respect to the portion 34 in response to the adjustable rotation of such screw. A lock nut 68 may be positioned upon the screw 66 to lock the screw in position upon the portion 34 after such screw is adjusted to its desired position. The screw 66 of adjustable stop member 18 is adapted to cooperate with the arm 22 and to limit its rotation about the adjusting member 16 towards the thermal responsive element 14. Accordingly the adjustable stop member 18 may readily adjust the opening temperature of the circuit interrupter 10 as hereinafter described.

The slidable member 20 is, in this instance, formed of an insulating material to prevent electrical conduction from the movable contact 24 through to the supporting structure 12. However, it is to be understood that the member or pin 20 may be formed from any other suitable material providing such pin is properly insulated from the cooperating contacts 24 and 26. An elongated guide portion 72 is rigidly attached to or integral with the pin 20 and is located upon one end thereof. The guide portion 72 is adapted to cooperate with the arm 22 so as to prevent such arm from becoming disengaged from the pin 20 and adjusting member 16.

A somewhat smaller diametered cylindrical pin portion 74 is located upon the other end of the pin 20 to cooperate with the movable contact 24. In addition to the pin portion 74, a plurality of protuberances 76 extend outwardly from the pin 20 and are located radially from the pin portion 74. The protuberances are adapted to cooperate with the movable contact 24 in conjunction with the pin 74 so as to prevent any binding action therebetween as hereinafter described.

The arm 22 is preferably formed of a metallic material and has a substantially rectangular shaped aperture 78 located in one end thereof, an irregularly shaped crimped portion 80 located substantially intermediate the ends thereof and a small inwardly extending bossed portion 82 located at the other end thereof. In addition to the rectangular aperture 78, there is located a transversely extending bossed portion 84 located within the arm 22 in line with aperture 78. The aperture 78 and bossed portion 84 are adapted to cooperate with the portion 72 of pin 20, and with the pin 20 to transmit the rockable motion of the arm 22 to the pin 20 without any binding action therebetween.

A relatively small aperture 86 is located within the crimped portion 80 of arm 22 to permit the free passage therethrough of the tapered pin portion 62 of the adjusting member 16. The aperture 86 is somewhat smaller than the shoulder 60 of adjusting member 16, so that arm 20 will freely rock about or fulcrum upon the shoulder portion 60, while the tapered pin portion 62 will prevent the arm 22 from moving transversely with respect to the adjusting member 16.

The bossed portion 82 of arm 22 is adapted to be engaged by or cooperate with the thermal responsive member 14 (see Figs. 5, 6 and 7) whereby the flexing action of the bimetallic member 14 may be readily transmitted to the arm 22 so as to cause such arm to fulcrum or rock about the end of the adjusting member 16 as hereinafter described. The arm 22 is also adapted to cooperate with or engage the adjustable stop member 18 which, in turn, limits the free movement of the arm 22 towards the bimetallic member 14 (see Figs. 2 and 7).

It is, therefore, obvious that the cooperation of guide portion 72 located within the rectangular aperture 78 and the cooperation of tapered pin portion 62 within aperture 86 retains the arm 22 in a relatively fixed location with respect to the adjusting member 16, bimetallic member 14, adjustable stop member 18 and slidable pin 20. In addition, the cooperation between the transversely located bossed portion 84 with pin 20 and the shoulder 60 with the crimped portion 80, permits the arm 22 to freely rotate about the tapered pin portion of adjusting member 16 and to move the pin 20 upon such rotation without any binding action between adjusting member 16 or the pin 20.

The cooperating contacts, including a movable contact 24 and a stationary contact 26 are attached to and are associated with suitable terminals 88 and 90 to permit the circuit interrupter 10 to be associated with a circuit in any well known manner. The stationary contact 26 is rigidly attached to and electrically associated with the terminal 90 by means of a rivet 92. Terminal 90 and stationary contact 26 are insulated from the upwardly extending contact portion 32 of supporting structure 12 by means of suitable insulating members 94 and 96. The movable contact 24 is rigidly attached to and electrically associated with a resilient arm 102, which is attached to the terminal 88 by means of a suitable rivet 98 and spacer block 100. The terminal 88, rivet 98, spacer block 100 and arm 102 are insulated from the supporting structure 12 by means of the insulating members 94 and 96 in a well known manner. The arm 102 is rigidly attached to the rivet 98 upon the outer surface of the spacer block 100 and one end of it is bent inward so as to engage one of the insulating members 96 which, in turn, prevents the contact arm 102 from rotating about the rivet 98. The resilient contact arm 102 is thus permitted to flex about the spacer block 100 so as to bias the cooperating contacts 24 and 26 in engagement with each other, and to convey current from the terminal 88 through rivet 98, and such arm 102 to contact 24. The free end of the contact arm 102 engages the protuberances 76 and cooperates with the reduced pin portion 74 of slidable pin 20 which fits through an aperture 103 in such arm.

Accordingly, it follows that the free end of the contact arm 102 supports one end of the slidable pin 20. The pin 20 will thus, through the cooperation of the protuberances 76 and portion 74 with the free end of arm 102, be adapted to force the contact arm 102 outwardly in response to the rockable action of the arm 22, so as to disengage the cooperating contacts 24 and 26 in response to an increase in temperature of the thermal responsive element 14 as hereinafter described.

The circuit interrupter or thermostat 10 thus comprises an irregularly shaped supporting structure 12, an adjusting member 16 which is threadedly attached to the supporting structure 12 and has rockably or fulcrumly mounted upon its free end the arm 22 so as to permit the arm 22 to rock thereabouts and to bodily move the arm 22 when it is desired to adjust the operation of the cooperating contacts 24 and 26. The arm 22, fulcrumly positioned upon the adjusting member 16, cooperates with the adjustable stop member 18 and insulating slidable pin 20 so as to rock about the free end of the adjusting member 16 as the bimetallic member 14 flexes outwardly to disengage the cooperating contacts.

When operating the thermostat or circuit interrupter 10, embodying my invention, with a waffle iron 28, or the like, such thermostat is rigidly attached to and is in thermal communication with a grid structure or cooking surface of such appliance 28 (see Fig. 1) in which it is desired to have the thermostat control or maintain an average temperature. The terminals 88 and 90 are then attached to the circuit (not shown) of such appliance so as to introduce the cooperating contacts 24 and 26 into such circuit.

Assuming that the thermostat is associated with the appliance circuit and that the thermostat is in its cold, closed or engaged position (see Figs. 2, 3 and 4), the thermal responsive element is shown as substantially in contact with the portion 34 of the supporting structure 12 (see Fig. 7) and not in engagement with the arm 22. However, such element may be contacting the arm 22, depending upon the setting of the adjusting member 16, with the cooperating contacts 24 and 26 in an engaged position. Further, the arm 22 will rest against the adjustable stop member 18, due to the biasing action of the contact arm 102 and the cooperation of slidable pin 20 when the adjusting member 16 is moved to the off position.

Figure 2:
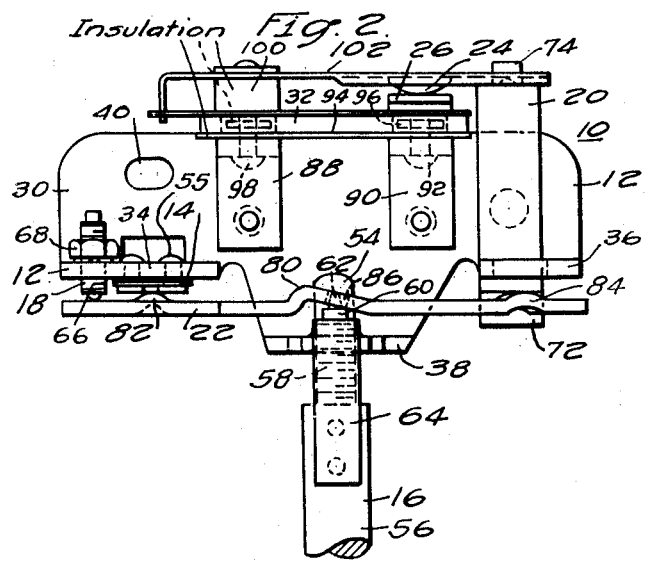
Figs. 2, 3 and 4 are top plan, side elevational, and end views, respectively, of a thermostat embodying my invention in a closed or operative position.
Figure 3:
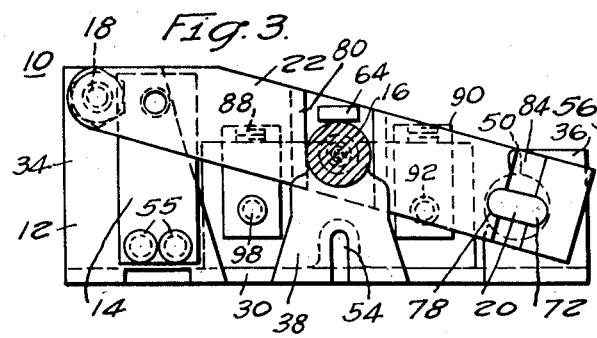
Figure 4:
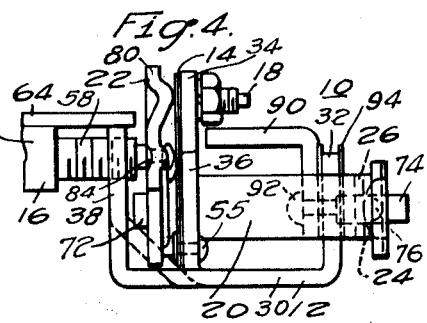

Assuming that the temperature of the appliance increases with the passage of current passing through the cooperating contacts and the heat produced thereby is conducted through the supporting structure 12 to the thermal responsive element 14, such thermal responsive element 14 will flex outwardly about the rivets 55 away from the portion 34. With the continued flexing action of thermal responsive element 14, the upper or free end of such element engages the boss 82 within the arm 22 and causes such arm to flex about the free end of the adjusting member 16 in a counter-clockwise direction as seen in Figs. 2 and 5. The rotation or fulcruming action of arm 22 about the free end of adjusting member 16 causes the sliding member 20 to be moved backward through the portion 36 of supporting structure 12 and to cause the contact arm 102 to be rotated or flexed in such a manner that movable contact 24 will be disengaged from the stationary contact 26.

As the cooperating contacts 24 and 26 are disengaged, the current flowing through such contacts to the appliance will be interrupted, whereupon the temperature thereof will decrease. Accordingly, the temperature of the thermal responsive element will be reduced, permitting such element to return to its normal position. The arm 22 will then be biased in a clockwise direction through the cooperative action of resilient contact arm 102 and slidable pin 20, permitting the reengagement of contacts 24 and 26.

It follows that the adjusting member 16 may be moved inwardly or outwardly with respect to the supporting structure 12 so as to bodily move the fulcruming position of arm 22. This, in turn, adjusts the operating characteristics of the thermostat by causing the thermal responsive element 14 to force the arm 22 a greater or less distance depending upon the location of adjusting member 16. Thus the opening temperature of the thermostat may be increased or decreased at the will of the operator by merely rotating the adjusting member 16.

In addition, the adjusting member 16 may be rotated to the "off" position, at which time the arm 22 is moved back until it contacts adjustable stop 18. The insulating pin 20 and arm 102 are then moved backwards, whereby the contacts are disengaged. This action is accomplished by adjusting the stop member 18 slightly below the position assumed by the thermal responsive element 14 at the lowest operating temperature desired. Accordingly, as adjusting screw 16 is turned further in a continuous direction from the lowest temperature setting, the arm 22 will be rotated an additional amount about the stop member 18 and adjusting member 16 so as to move the pin 20 and arm 102 backwards. This action separates contacts 24 and 26 regardless of the associated temperature variations, and maintains the thermostat in an "off" position.

It follows that as the contacts are separated during the normal operation thereof, there will be a certain amount of arcing therebetween and that such arcing action will increase the temperature of the cooperating contacts. In addition, the current flowing through the contacts will increase the temperature thereof in a well known manner. However, the temperatures produced in such a manner do not appreciably affect the operation of the thermal responsive element, inasmuch as the heat so produced must be conducted through the supporting structure 12 to the thermal responsive element 14. Further, with the supporting structure 12 rigidly attached to a heated appliance, the small amount of heat produced at the cooperating contacts 24 and 26 will not appreciably alter the thermal characteristics of the thermal responsive element 14, inasmuch as the heat from the appliance will be conducted directly to the bimetallic member.

It is, therefore, obvious that the heat produced within the cooperating contacts cannot cause the bimetallic member to remain in a position where there will be the so-called hunting or fluttering action of the contacts. This condition, in turn, makes possible a slow make and break thermostat which will have positive operations.

It is, therefore, further obvious that the thermostat embodying my invention, while being a slow make-and-break thermostat, may be positioned upon or associated with any of the present well known appliances and will not produce any undue radio-interfering action and will have a long life, inasmuch as the temperature produced at the cooperating contacts will not affect the action of the thermal responsive element.

Various modifications may be made in the device embodying my invention without departing from the spirit and scope thereof, and I desire, therefore, that only such limitations shall be placed thereon as are imposed by the prior art and the appended claims.

I claim as my invention:

1. In a circuit interrupter, cooperating contacts, an adjusting member, an adjustable stop member, and an arm engaging the adjusting member at a point intermediate the ends of such arm, said arm adapted to engage the stop member at one end and to cooperate with the contacts through the other end, whereby the predetermined adjusted position of the stop member determines the relative position of the adjusting member for disengaging the cooperating contacts.

2. In a circuit interrupter, cooperating contacts including at least one movable contact, an adjusting member, an adjustable stop member, a thermal responsive element which changes its shape with the changes in temperature thereof, a slidable member adapted to cooperate with the movable contact, an arm fulcrumly engaging the adjusting member and slidable member and adapted to engage the adjustable stop member, said element adapted to engage the arm and rotate it about the adjusting member for disengaging the contacts through the cooperative movements of the arm and slidable member, said adjustable member adapted to bodily position the fulcruming point for adjusting the operations of the contacts, and said adjustable stop being adapted to limit the movement of the arm for determining the relative position of the adjusting member which will disengage the contacts independent of the movements of the thermal responsive element.

3. In a circuit interrupter, a support, a stationary contact and a cooperating movable contact, an adjusting member mounted on said support, a rockable arm fulcrumly mounted on said adjusting member, means slidably mounted in said support and directly engaging a point on said rockable arm spaced from said adjusting member for operating said movable contact, and thermal responsive means mounted on said support and directly engaging a point on said rockable arm spaced from both said adjusting member and said slidably mounted means.

4. In a circuit interrupter, a support, a stationary contact and a cooperating movable contact, an adjusting member mounted on said support, a rockable arm fulcrumly mounted at an intermediate point on said adjusting member, means slidably mounted in said support and directly engaging one end of said rockable arm for operating said movable contact, and thermal responsive means mounted on said support and directly engaging the other end of said rockable arm.

5. In a circuit interrupter, a support, a stationary contact and a cooperating movable contact, an adjusting member mounted on said support, a rockable arm fulcrumly mounted at an intermediate point on said adjusting member, an insulating pin slidably mounted in said support and directly engaging one end of said rockable arm for operating said movable contact, and a slow-acting bimetallic strip mounted on said support and directly engaging the other end of said rockable arm.

EARL K. CLARK.